(12) United States Patent
Boerner

(10) Patent No.: US 7,966,737 B2
(45) Date of Patent: Jun. 28, 2011

(54) FOOD CUTTING APPLIANCE

(75) Inventor: Juergen Boerner, Landscheid-Niederkail (DE)

(73) Assignee: Boerner Kunststoff- und Metallwarenfabrik GmbH, Landscheid-Niederkail (DE)

(*) Notice: Subject to any disclaimer, the term of this patent is extended or adjusted under 35 U.S.C. 154(b) by 0 days.

(21) Appl. No.: 11/581,312

(22) Filed: Oct. 16, 2006

(65) Prior Publication Data

US 2007/0028460 A1 Feb. 8, 2007

Related U.S. Application Data

(62) Division of application No. 10/430,758, filed on May 1, 2003, now Pat. No. 7,146,737.

(30) Foreign Application Priority Data

Nov. 2, 2000 (DE) ................... 100 54 174

(51) Int. Cl.
*A47J 43/25* (2006.01)
*B26D 3/26* (2006.01)

(52) U.S. Cl. ............ 30/279.2; 30/278; 83/856; 83/858; 99/537

(58) Field of Classification Search ............ 30/278, 30/279.2, 283; 83/856, 857, 858; 99/537
See application file for complete search history.

(56) References Cited

U.S. PATENT DOCUMENTS

| | | | | |
|---|---|---|---|---|
| 66,402 A * | 7/1867 | Schwartz | ............ | 83/856 |
| 4,570,519 A * | 2/1986 | Motosko, II | ............ | 83/856 |
| 4,624,166 A | 11/1986 | Kreth et al. | | |
| 4,733,588 A * | 3/1988 | Yamamoto | ............ | 83/857 |
| 4,733,589 A * | 3/1988 | Wolff | ............ | 83/858 |
| 5,001,835 A * | 3/1991 | Boerner | ............ | 30/278 |
| 5,148,731 A * | 9/1992 | Boerner | ............ | 83/857 |
| 5,765,472 A | 6/1998 | Kim | | |
| 6,082,645 A * | 7/2000 | Himmighofen et al. | ...... | 241/168 |
| 6,732,622 B2 | 5/2004 | Vincent | | |
| 6,805,044 B1 | 10/2004 | Yamamoto | | |
| 7,146,737 B2 * | 12/2006 | Boerner | ............ | 30/279.2 |
| 7,322,112 B2 * | 1/2008 | Boerner | ............ | 30/279.2 |
| 7,712,402 B2 * | 5/2010 | Ishii | ............ | 83/13 |
| 2007/0207657 A1 * | 9/2007 | Boerner | ............ | 439/368 |

FOREIGN PATENT DOCUMENTS

| | | |
|---|---|---|
| CH | 95 349 | 10/1921 |
| CH | 13 43 17 | 8/1928 |
| DE | 11 45 759 B | 5/1959 |
| DE | 66 08 205 U | 5/1967 |
| DE | 33 47 874 A1 | 10/1983 |
| DE | 35 00 959 A1 | 1/1985 |
| DE | 89 09 068 U1 | 7/1989 |
| DE | 91 10 587 U1 | 8/1991 |
| DE | 27 077 A1 | 6/1998 |

(Continued)

*Primary Examiner* — Hwei-Siu C Payer
(74) *Attorney, Agent, or Firm* — William A. Drucker

(57) ABSTRACT

A kitchen appliance for cutting cuttable material such as vegetables, fruit, etc., with a main body. The appliance comprises a guide surface on which the cuttable material can be moved to and fro, and a blade which, for cutting, is arranged offset in relation to the guide surface so that a piece is cut off from a cuttable material moved on the guide surface in the guide direction toward the blade. The offset between the blade and the guide surface determines the cutting thickness. The appliance further comprises an exchangeable insert for modifying the cutting thickness.

3 Claims, 9 Drawing Sheets

FOREIGN PATENT DOCUMENTS

| | | |
|---|---|---|
| DE | 298 21 132 U1 | 11/1998 |
| EP | 0 306 017 A2 | 9/1988 |
| FR | 2 401 001 | 6/1978 |
| GB | 848 046 A | 1/1959 |
| JP | 63-30495 | 2/1988 |
| JP | 03-043196 | 7/1989 |
| JP | 1-163093 | 11/1989 |
| JP | 07-020291 | 4/1995 |
| JP | 3022202 B | 12/1995 |
| JP | 11-318724 | 5/1998 |
| JP | 11-346940 | 6/1998 |
| JP | 2000-201840 | 1/1999 |
| RU | 2041 793 C1 | 8/1993 |
| WO | WO 95/24995 | 3/1994 |

\* cited by examiner

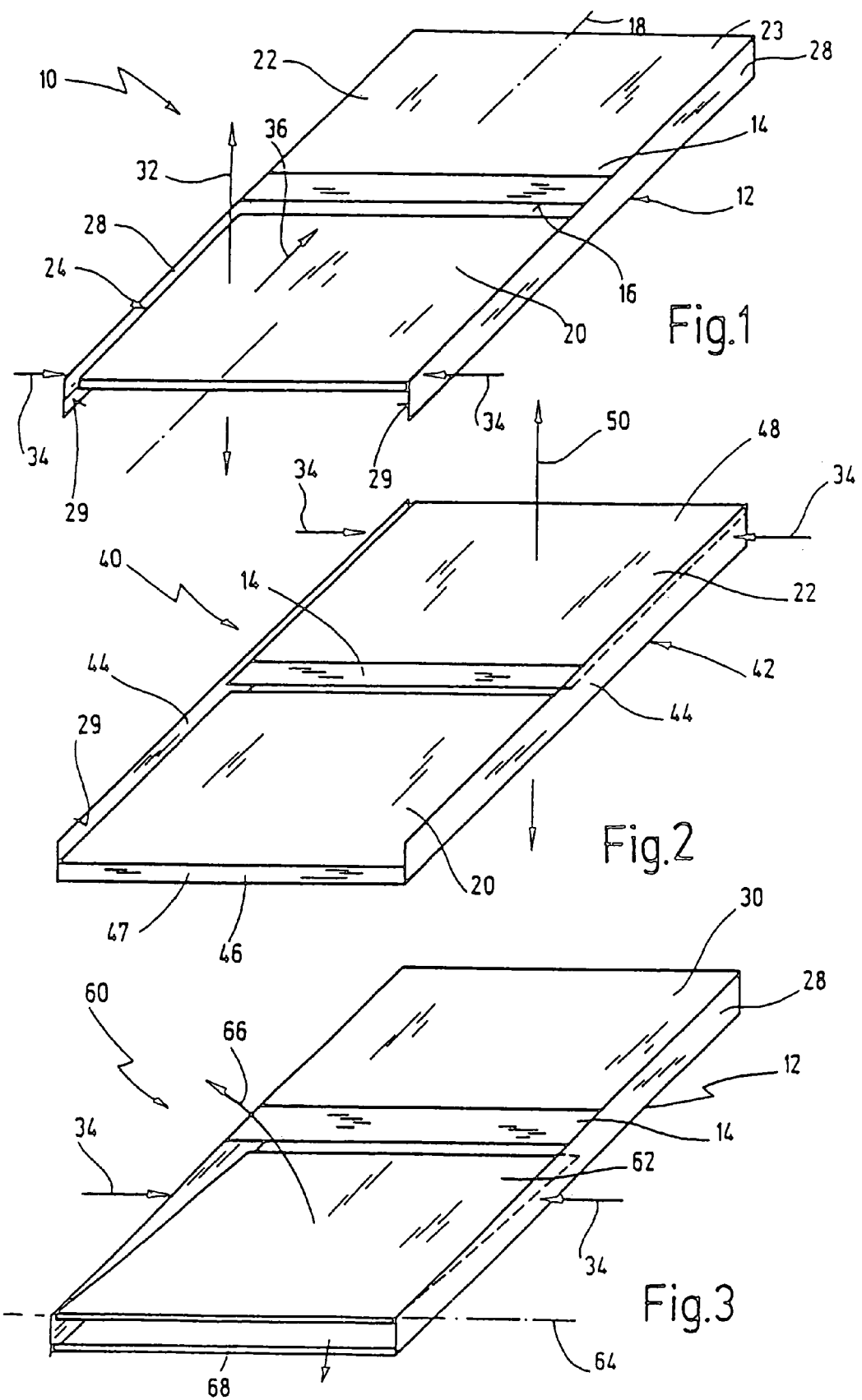

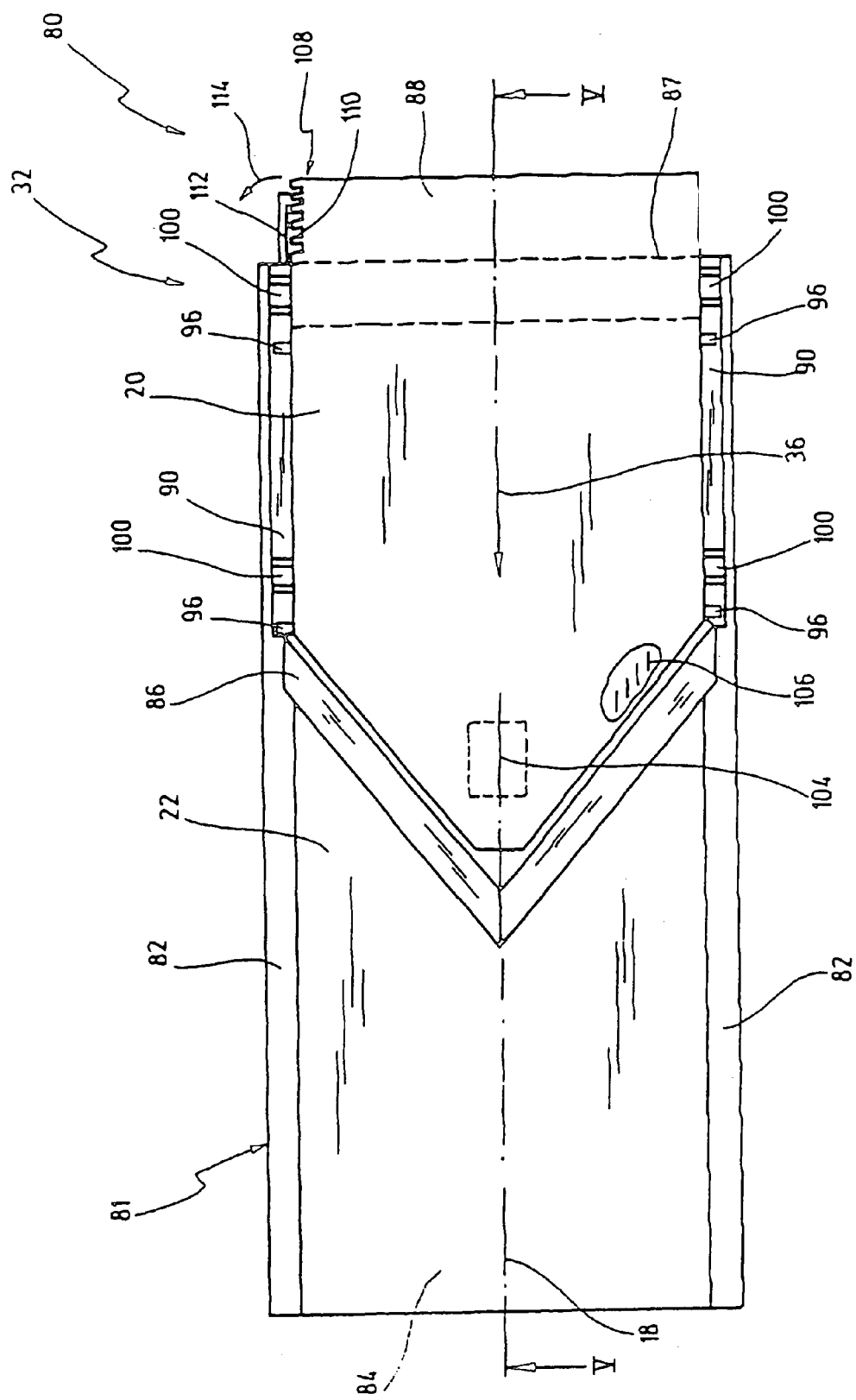

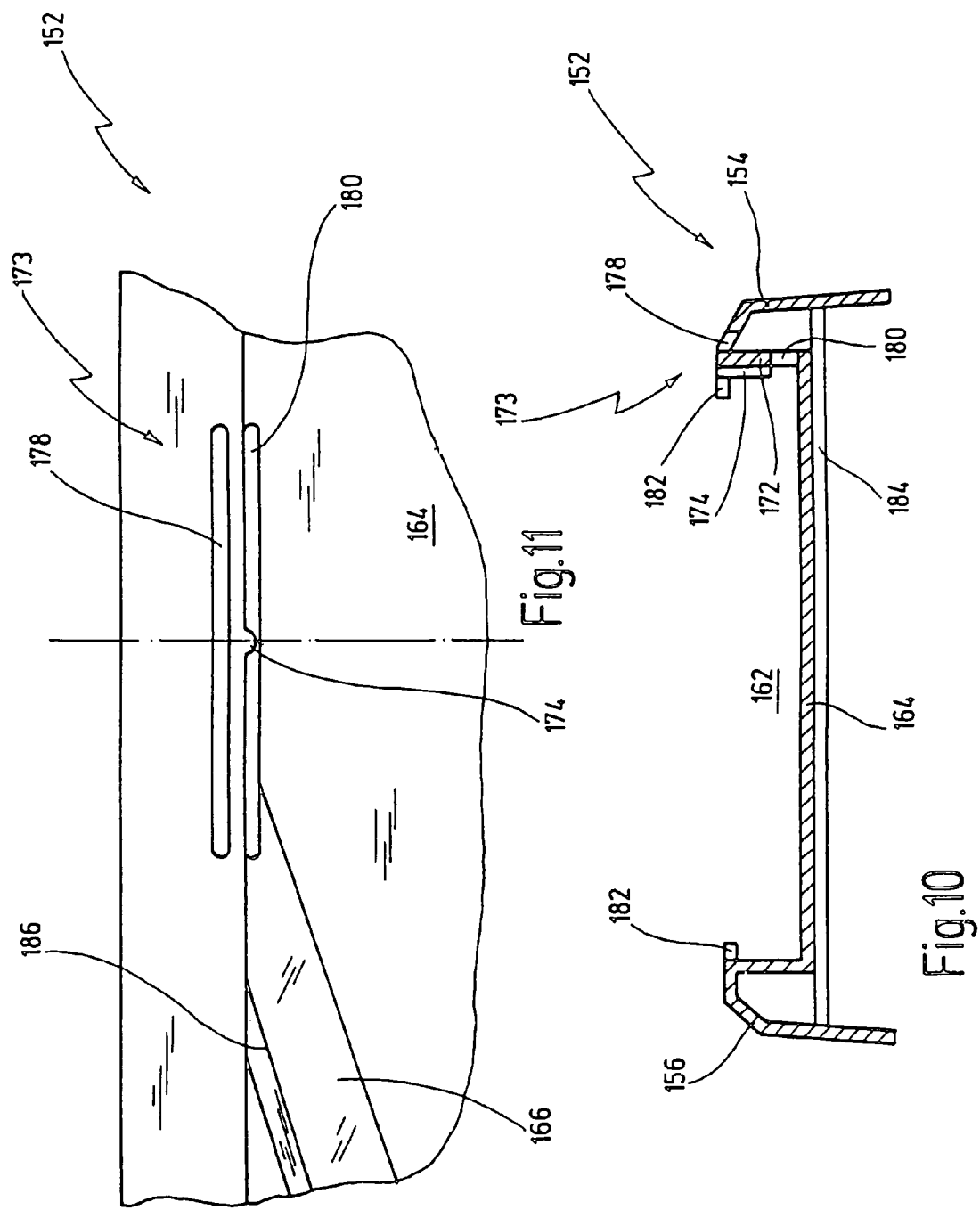

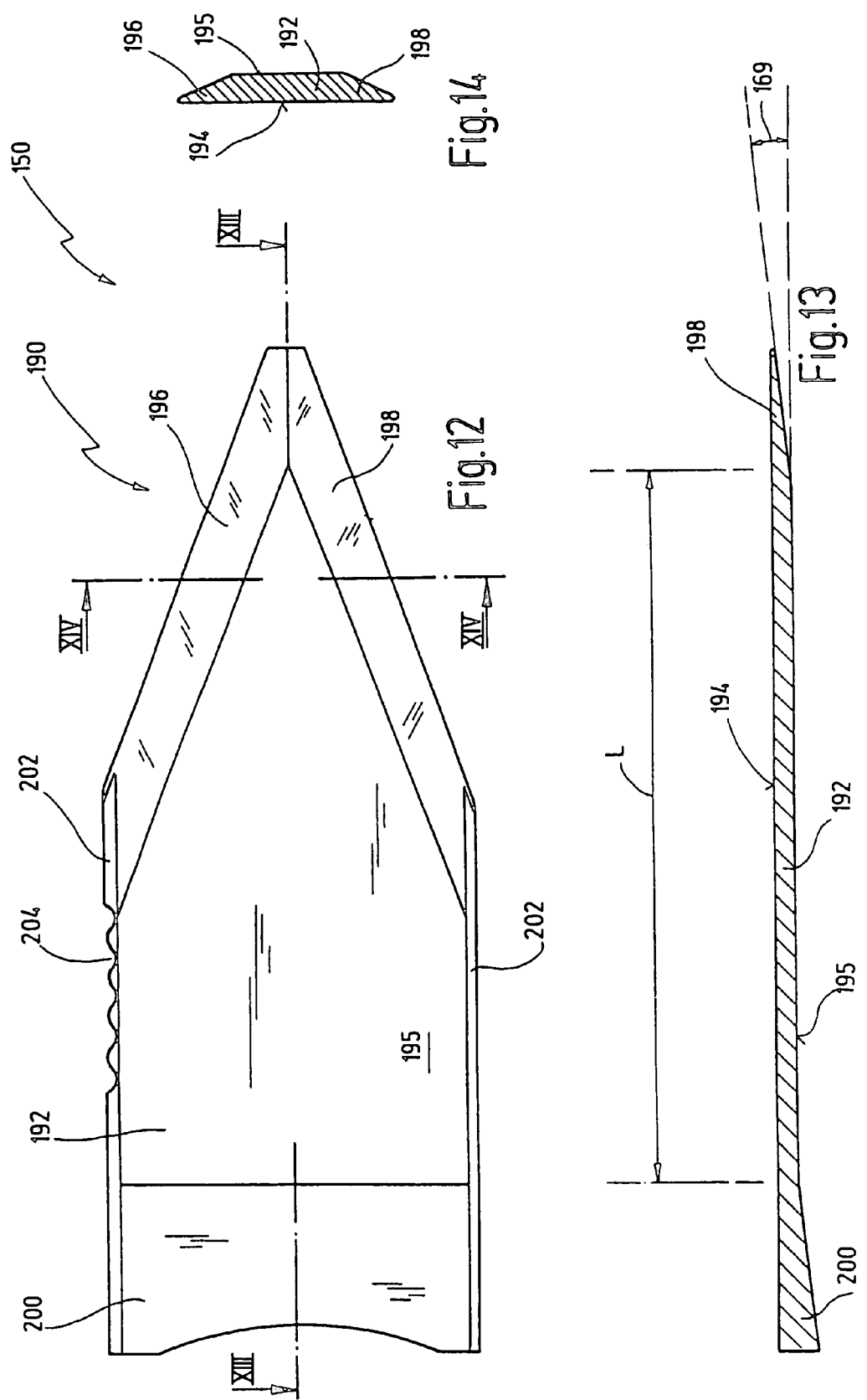

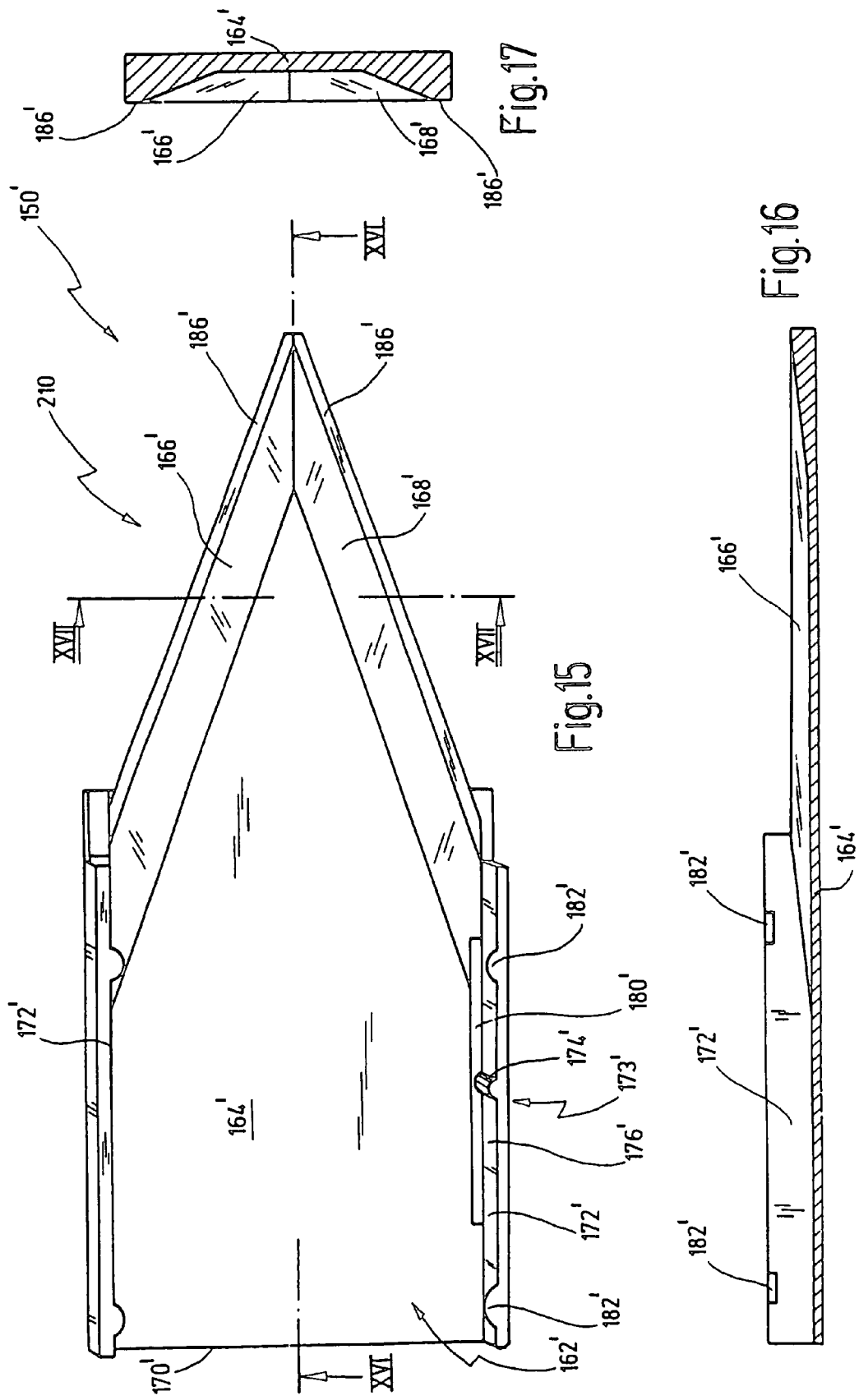

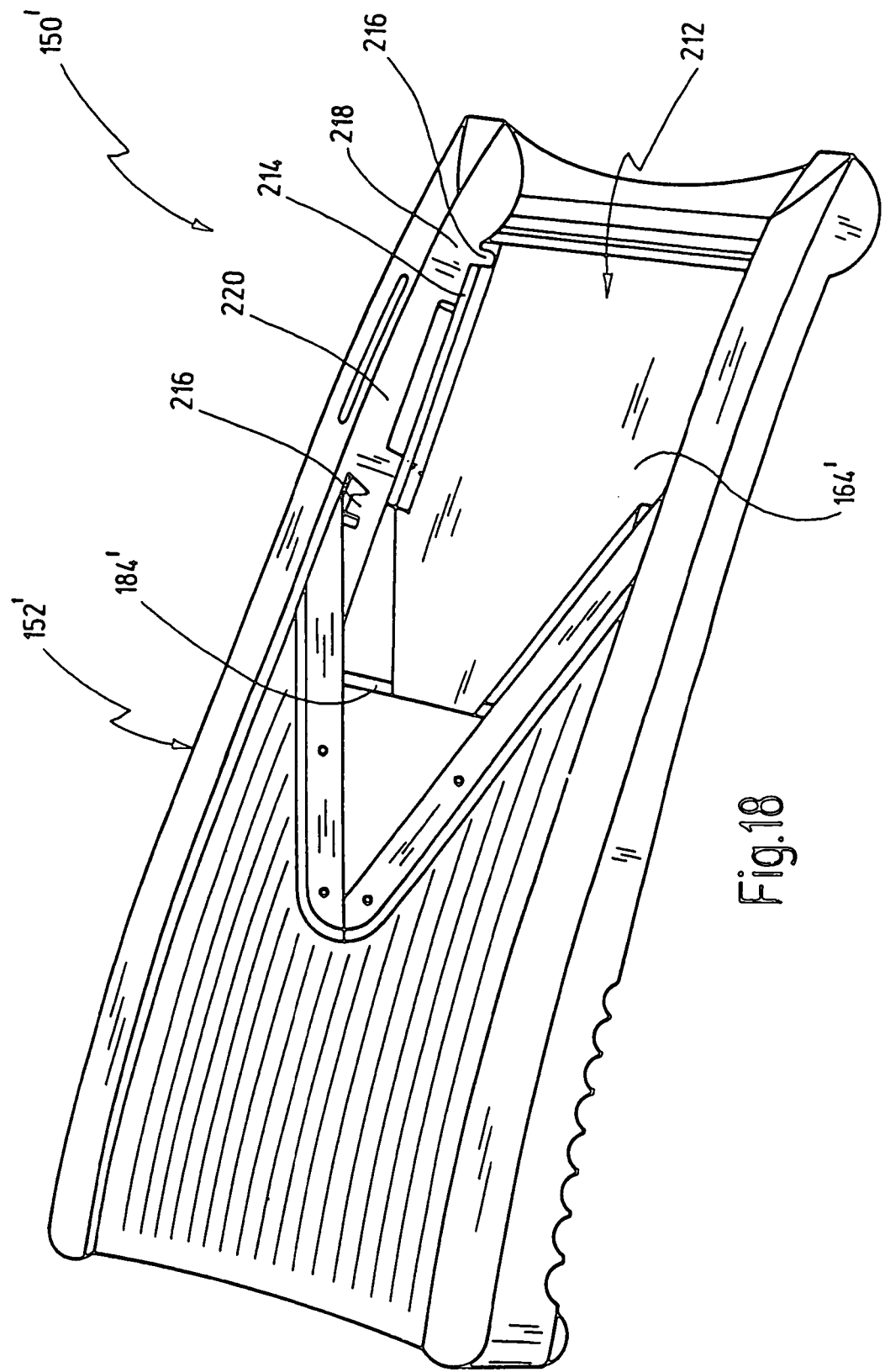

FOOD CUTTING APPLIANCE

CROSS REFERENCE TO RELATED APPLICATION

This application is a divisional application of U.S. patent application Ser. No. 10/430,758, filed 1 May 2003, now U.S. Pat. No. 7,146,737, which claims priority from German patent application 100 54 174, filed 2 Nov. 2000 and PCT application EP 01 126 51, filed 31 Oct. 2001.

BACKGROUND OF THE INVENTION

The present invention relates to a kitchen appliance for cutting cuttable material such as vegetables, fruit, etc., with a main body, a guide surface on which the cuttable material can be moved to and fro, a blade which, for cutting, is arranged offset in relation to the guide surface so that a piece is cut off from a cuttable material moved on the guide surface in the guide direction toward the blade, the offset between the blade and the guide surface determining the cutting thickness, and with an exchangeable insert for modifying the cutting thickness.

A kitchen appliance of this type is known, for example, from the printed documents DE 298 21 132 U1, EP 306 017 and DE 89 09 068 U1.

Such kitchen appliances are generally also referred to as kitchen slicers. To cut cucumbers, for example, the slicer is generally held over a bowl and, by moving the cucumber to and fro, slices thereof are cut off one after another. The slices fall through a slit between the blade and the guide surface and down into the bowl.

The guide surface is often also referred to as the approach surface. Adjacent to the blade, in the guide direction, there is generally a further guide surface, also called the run-out surface.

The blade is generally arranged transversely with respect to the guide direction. It can, for example, be arranged perpendicular to the guide direction or slightly obliquely thereto. A particularly advantageous configuration is a V-shaped blade in which two obliquely arranged blades run together approximately at the center.

The kitchen appliance can be made of metal, but the main body is often made of plastic.

Abovementioned DE 298 21 132 U1 discloses a kitchen appliance in which two lateral frame parts are connected integrally to an upper guide plate. The frame parts also have grooves for inserting a lower guide plate at different heights.

DE 198 27 077 A1 discloses a device for comminuting food products, with a base plate and an exchangeable grating insert which is pushed from the side into an opening. The grating insert is made of plastic and has a transversely extending blade on its top. Before the blade, in the cutting direction, a guide path is mounted pivotably by means of a living hinge and is supported in one of several pivot positions by a movable adjustment lever.

For adjustment of the cutting height, it is further possible, in the known V-shaped slicer from the Applicant, to modify the cutting thickness by exchanging or turning around an insert piece which forms the lower guide surface and which can be pushed in the guide direction into the slicer.

WO 95/24995 discloses a vegetable slicer for cutting cubes, having an approach surface and a run-out surface which is parallel to the latter and on the front edge of which a V-shaped blade is arranged. Before the blade and after the blade, in the cutting direction, there is in each case a row of perpendicular blades which are spaced apart in the transverse direction. If the cuttable material is turned through 90° between successive cutting maneuvers (cuts), it is possible to cut cubes with the vegetable slicer. The size of the cubes cannot be varied.

DE 89 09 068 U1, mentioned at the outset, discloses a waffle cutter with a main body and an insert in the form of a slide plate. The receiving seat of the main body for the slide plate has a supporting plate designed as a closed surface. The supporting plate has a large number of recesses. On the underside of the slide plate there are a correspondingly large number of downwardly projecting lugs. The slide plate can be locked in two different positions on the receiving seat in the guide direction. In one position, the lugs engage in the recesses. In the other position, the lugs rest on the supporting plate. By pressing the slide plate out of the recesses and subsequently moving the slide plate in the guide direction, it is thus possible to reduce the cutting thickness.

Finally, EP 0 306 017 A2, mentioned at the outset, relates to a kitchen slicer which has a main body and an insert. The insert can be pushed into the main body in the guide direction. The insert has two plate parts, the distance between which is adjustable. In one configuration, the plate parts can be screwed to each other. In a further configuration, a wedge is arranged between the plates. In both configurations, the plate parts are mutually adjusted in a direction perpendicular to the guide direction.

The object of the invention is to make available an improved kitchen appliance with which it is possible to modify the cutting thickness in a simple way.

SUMMARY OF THE INVENTION

In the kitchen appliance mentioned at the outset, and in accordance with a first aspect of the invention, this object is achieved by virtue of the fact that the insert, in the inserted state, is mounted so as to be fully movable on the main body and can be fixed in different positions on the main body in order to modify the cutting thickness.

The kitchen appliance according to the invention consequently consists of a small number of individual parts. Moreover, the cutting thickness can be modified in a simple way. In particular, to modify the cutting thickness, it is not necessary to replace an insert or to remove it and then insert it again in another position.

It is particularly preferable if the insert, in the inserted state, is mounted so as to be displaceable substantially parallel to the guide direction and can be fixed in different parallel displacement positions on the main body in order to modify the cutting thickness.

By means of the parallel displacement of the insert, it is possible, on the one hand, to achieve a constantly good cutting quality at all cutting thicknesses, because the angle of attack between guide surface and blade remains substantially constant, in particular 0°.

On the other hand, it is comparatively simple in design terms, in this embodiment, to mount the insert so that it is fully movable in the inserted state and can be fixed in different positions.

The parallel displaceability can be obtained by a wide variety of measures, for example by parallelogram links.

However, it is particularly preferable if a parallel guide between the main body and the insert has at least two ramp guides which are arranged in such a way that a displacement of the insert in a first direction necessarily causes a movement in a direction perpendicular thereto.

The first direction here preferably lies in a main plane of the main body and, for example in the case of a V-shaped slicer, is preferably the guide direction. In kitchen appliances in which the blade is oriented straight, the first direction can also lie parallel to the cutting edge of the blade.

In the kitchen appliance mentioned at the outset, and in accordance with a second aspect of the invention, the above object is achieved by virtue of the fact that the insert is designed to be movable in relation to a receiving seat of the main body in the guide direction, and ramp guides are provided on the receiving seat and/or on the insert so that a movement of the insert in the guide direction causes a movement transverse to the guide direction in order to modify the cutting thickness.

The kitchen appliance according to the second aspect of the invention is robust and can be made with a small number of parts. The cutting thickness is adjusted by means of the insert which is moved in the guide direction with respect to the receiving seat, and by means of the ramp guides which ensure that a longitudinal movement is necessarily converted into a "lifting" movement, that is to say the space between the guide surface and the blade is modified.

The change which this causes in the longitudinal spacing of the guide surface from the blade in the guide direction is here taken into account. It has been found that the change in this longitudinal spacing is in practice largely negligible.

By means of the ramp guides, however, it is comparatively easy to ensure that the guide surface extends approximately parallel to the plane of the blade upon each adjustment of the cutting thickness. In this way, it is possible to avoid the cuttable material jamming during the cutting operation, and the cut passes smoothly and without obstruction through the cuttable material irrespective of the particular cutting thickness that has been set. In the prior art, by contrast, it has generally been attempted, also on adjustment of the cutting thickness by parallel displacement, to keep the longitudinal spacing between the end edge of the guide surface and the opposite cutting edge as constant as possible. For example, in abovementioned EP 0 306 017 A2, the insert is chosen to be configured in three parts in order to be able to adjust two opposite plate parts exactly perpendicular to the guide direction by means of a wedge which is arranged between them.

DE 89 09 068 U1, also mentioned above, admittedly discloses how a slide plate can be locked in two different axial positions on a main body in order to effect an adjustment of the cutting thickness. However, in this known kitchen appliance, the adjustment is effected by a pattern of movement which is rather impractical. This is because, in order to reduce the cutting thickness, the slide plate first has to be lifted out of the recesses perpendicular to the guide direction. For this purpose, a corresponding opening is provided in the main body. This is followed by axial displacement in the guide direction until a second locking position is reached. This arrangement also suffers from the disadvantage that it is generally possible to select only two cutting thicknesses, not a large number of cutting thicknesses.

The solutions according to the first aspect and second aspect of the present invention, however, permit adjustment of the cutting thickness in more than two steps, for example in three or four or even more steps. In some cases the adjustment is even stepless.

Consequently, the object is also completely achieved according to the second aspect of the invention.

It is particularly advantageous if the receiving seat is made in one piece with the main body.

In this configuration, it is possible to make the kitchen appliance basically in two parts, namely the main body and the insert (or a large number of different inserts).

In an alternative configuration, the receiving seat is formed on an adapter which can be fixed on the main body in an operating position.

This embodiment is particularly advantageous for the retrofitting of existing kitchen appliances, in particular the known V-shaped slicer from the Applicant.

As has been mentioned above, the V-shaped slicer of the prior art permits adjustment of cutting thickness by means of inserts being exchanged or turned around. By provision of the adapter, said adapter can in the first instance be inserted instead of an insert into the main body of the V-shaped slicer of the prior art. The combination of main body and adapter then has the same or substantially the same function as a main body on which the receiving seat is formed in one piece.

It is particularly preferable, in this connection, if the adapter can be pushed into the main body in the guide direction and locks in the operating position.

The adapter itself is consequently fixed on the main body in a single position, the operating position. By being able to be pushed in in the guide direction, the adapter can be combined in particular with the known abovementioned V-shaped slicers of the prior art.

According to a preferred embodiment, the insert is designed to be movable in relation to the receiving seat in the guide direction when the adapter is fixed in the operating position.

The first and second aspects of the present invention are realized in this embodiment. In the inserted state, the insert is displaceable in the guide direction so as to adjust the cutting thickness.

According to an alternative preferred embodiment, the insert is movable in relation to the receiving seat when the adapter is removed from the operating position, and the insert is not movable in relation to the receiving seat when the adapter is fixed in the operating position.

In the alternative embodiment, a relative axial displacement between insert and adapter takes place, to modify the cutting thickness, when the adapter is removed from the main body. As soon as the adapter is fixed in the operating position, with the insert fixed in a defined position, the adjustment function in the guide direction is locked.

While the first alternative embodiment permits a change of cutting thickness quickly and without effort, an on the whole greater degree of stability can be achieved in the second alternative embodiment.

It is further preferred if the angle of the ramp guides with respect to the guide surface is in the range of between 5° and 50°, preferably in the range of between 5° and 30°.

It is thereby possible, for a reasonably small amount of displacement in the first direction (or guide direction), to realize a reasonably large range of movement for adjusting the cutting thickness.

According to an advantageous embodiment, the ramp guides have ramps on the main body on which mating pieces of the insert lie.

It is generally also conceivable to provide ramps on the insert and slide pieces on the main body. However, providing ramps on the main body has the advantage of permitting a structurally simpler configuration of the insert. Since there are often a number of inserts for one main body, the kitchen appliance as a whole can be realized in a structurally simpler manner.

In this connection, it is particularly preferable if at least two ramp guides are formed on opposite sides of the main body, and if the slide pieces are formed by pins which protrude from sides of the insert.

This results in a compact configuration of the parallel guide.

It is further preferred if at least one central ramp portion is arranged underneath the insert in order to support the insert.

In this way it is possible to ensure that the insert does not sag even in the event of strong pressure from above.

In this connection, it is particularly preferable if the central ramp portion is arranged adjacent to the blade.

This ensures that the offset between blade and guide surface (the cutting thickness) remains constant irrespective of the pressure exerted on the guide surface.

According to an alternative embodiment, the insert, in the inserted state, is mounted so as to be pivotable about a pivot axis arranged offset in relation to the blade and can be fixed in different pivot positions on the main body in order to modify the cutting thickness.

In this embodiment, the means for fixing the insert on the main body can be realized particularly simply in terms of construction.

On the whole, it is preferable if the cutting thickness can be adjusted steplessly.

For this purpose, it is advantageous if a clamping device is provided in order to fix the insert in a desired position on the main body.

With stepless adjustability, the kitchen appliance can be adapted to a wide variety of cutting tasks.

According to an alternative embodiment, the cutting thickness can be adjusted in steps.

In this connection, it is advantageous if a locking device is provided for fixing the insert in one of several positions on the main body.

Especially when the main body and/or the insert is made of plastic, it is comparatively easy to realize a locking device.

It is also generally advantageous if the insert can be set into a position in which the edge of the guide surface lying opposite the blade lies level with or above the cutting edge of the blade.

In this (rest) position, which is provided in particular as a child safety feature, it is impossible to inadvertently grip the cutting edge of the blade. This cutting edge is covered by the edge of the guide surface.

It is also advantageous if a row of perpendicular blades oriented transversely with respect to the guide direction is provided on the guide surface of an insert.

In this way, it is readily possible for the cuttable material o be cut not in slices, but in strips.

In this connection, it is particularly preferable if the insert can be set into a position in which the top of the row of blades protrudes relative to the top of the blade by an extent which is at least as great as the cutting thickness.

In this way it is possible for the blades to form longitudinal scores in the cuttable material, on the underside that has not yet been cut off.

If, before a subsequent cutting maneuver, the cuttable material is turned through 90° or by a similar amount, the scores are cut through transversely by the blades to form a criss-cross pattern and are then cut off by the (normal) blade, so that blocks are obtained.

Consequently, the kitchen appliance can be used with a normal insert to cut slices, and, with the insert having the row of blades, to cut either strips of large thickness or cubes of smaller thickness.

It will be appreciated that the features mentioned above and those still to be explained below can be used not only in the respectively stated combination, but also in other combinations or in isolation, without thereby departing from the scope of the present invention. Illustrative embodiments of the invention are explained in greater detail below in the following description in which reference is made to the drawing, in which:

BRIEF DESCRIPTION OF THE DRAWINGS

FIG. 1 shows a first embodiment of a kitchen appliance in schematic representation, according to the first aspect of the invention;

FIG. 2 shows a second embodiment of a kitchen appliance in schematic representation, according to the first aspect of the invention;

FIG. 3 shows a third embodiment of a kitchen appliance in schematic representation, according to the first aspect of the invention;

FIG. 4 shows a plan view of a fourth embodiment of a kitchen appliance in schematic representation, according to the first and second aspects of the invention;

FIG. 10 shows a schematic cross-sectional view along the line X-X in FIG. 9;

FIG. 11 shows a plan view of a locking device of the main body in FIG. 9, shown in an enlarged representation;

FIG. 12 shows a bottom view of an insert for the main body shown in FIG. 9;

FIG. 13 shows a cross-sectional view along the line XIII-XIII in FIG. 12;

FIG. 14 shows a cross-sectional view along the line XIV-XIV in FIG. 12;

FIG. 15 shows a schematic perspective view of an adapter in a sixth embodiment of a kitchen appliance according to the first and second aspects of the invention;

FIG. 16 shows a cross-sectional view along the line XVI-XVI in FIG. 15;

FIG. 17 shows a cross-sectional view along the line XVII-XVII in FIG. 15, in an enlarged representation; and FIG. 18 shows a perspective view of a main body of the kitchen appliance in the sixth embodiment.

DESCRIPTION OF THE PREFERRED EMBODIMENTS

Figure 5:
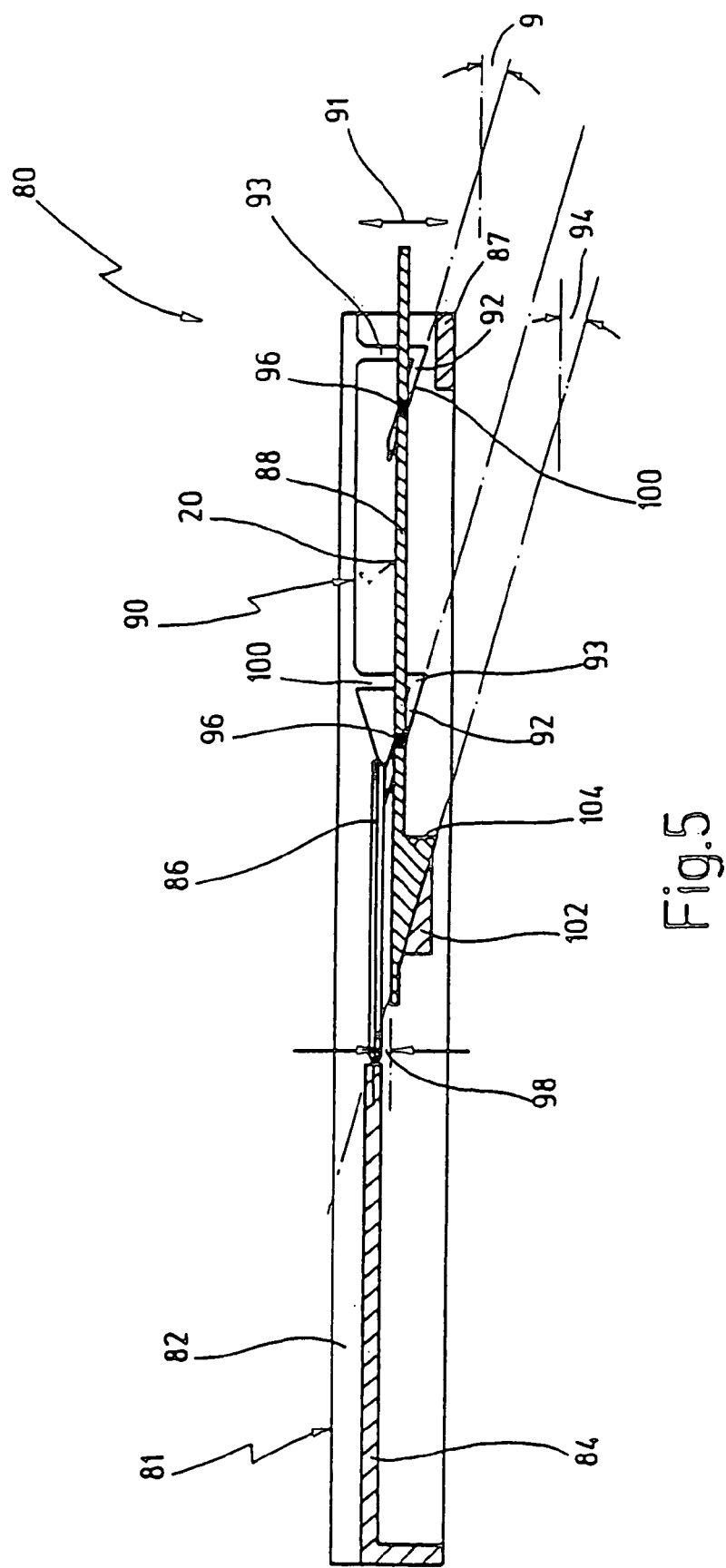
FIG. 5 shows a cross-sectional view along the line V-V in FIG. 4.

In FIG. 1, a first embodiment of the kitchen appliance according to the invention is designated in general by reference number 10.

The kitchen appliance 10 has a main body 12 which is in general approximately rectangular and on which a blade 14 with a cutting edge 16 is fixed.

The blade 14 is shaped as an approximately rectangular metal blade and extends perpendicular to a longitudinal axis 18 of the main body 12.

It will be appreciated that the blade 14 can also be arranged obliquely in relation to the longitudinal axis 18. Moreover, the blade can also be configured as a V-shaped blade which is made up of two individual blades.

The blade 14 is assigned a guide surface 20 which is arranged offset in relation to the blade 14. Provided on the other side of the blade 14 in the direction of the longitudinal axis 18, there is a run-out surface 22 which is aligned flush with the top of the blade 14.

The run-out surface 22 is configured as the top of a transverse support 23 of the main body 12.

The guide surface 20 is configured as the top of an exchangeable able insert 24. In the inserted state, the insert 24 is received between two longitudinal webs 28 of the main body 12 which extend from the transverse support 23 parallel to the longitudinal axis 18.

The insert 24 is here situated between two opposite inner sides 29 of the longitudinal webs 28.

In the inserted state, the insert 24 is mounted so as to be movable in a direction perpendicular to the longitudinal axis 18 by means of a parallel guide, as is indicated schematically at 32.

By means of the parallel offset of the insert 24 relative to the main body 12, and consequently relative to the blade 14, the cutting thickness of the kitchen appliance 10 can be adjusted.

The insert 24 can be fixed in any desired parallel displacement position by means of schematically indicated clamping means 34, so that a stepless adjustability of the cutting thickness is achieved.

It will be appreciated that the view of the kitchen appliance 10 in FIG. 1 is schematic. The surfaces 22, 20 can be both smooth and structured. It is further possible for the longitudinal webs 28 to be connected to one another at their freely protruding ends for strengthening purposes. The longitudinal webs 28 can also be raised in relation to the run-out surface 22 so as to allow a fruit holder or the like to slide over them without damaging the blade 14.

When using the kitchen appliance 10, a cuttable material such as fruit, vegetables, e.g. a cucumber, is moved to and fro in a guide direction 36 approximately parallel to the longitudinal axis 18. As the cuttable material is moved from the guide surface 20 past the blade 14 in the direction toward the run-out surface 22, a slice of the cuttable material is cut off. The slice which has been cut off falls down through the slit between blade 14 and insert 24, usually into a container located underneath.

Upon a subsequent return movement, the remainder of the cuttable material is moved across the blade 14 without cutting taking place. In the next movement in the guide direction, a slice is once again cut off.

It will be appreciated that the blade 14 does not necessarily have to be straight. For example, the blade 14 can also be fluted or corrugated.

To modify the cutting thickness, the clamping means 34 are released and the insert 24, without being removed from the main body 12, is displaced parallel to the plane of the blade with the parallel guide 32. As soon as the correct cutting thickness has been set, the clamping means 34 are again actuated in order to fix the insert 24 on the main body 12.

In FIG. 2, a second embodiment of a kitchen appliance is designated in general by reference number 40.

The kitchen appliance 40 is generally of a construction similar to that of the kitchen appliance 10 in FIG. 1. Identical parts are therefore provided with the same reference numbers. Only the differences are explained below.

The kitchen appliance 40 has a main body 42. The main body 42 has a transverse support 46, on top of which the guide surface 20 is formed, and two longitudinal webs 44 extending rearward from the transverse support 46.

A schematically indicated grip 47 is also formed integrally on the transverse support 46.

Mounted between the transverse supports 46, there is an insert 48 which on its top forms the run-out surface 22. The blade 14 is also provided on a forwardly directed edge of the insert 48.

The insert 48, with the blade 14 located thereon, is designed to be displaced, by a schematically indicated parallel guide 50, relative to the main body 12 and approximately parallel to the guide surface 20.

Clamping means 34 are again used for fixing the insert 48 on the main body 42.

The handling and the function of the kitchen appliance 40 are identical to the kitchen appliance 10. To modify the cutting thickness, only the position of the insert 48 is changed instead of that of the insert 24.

In FIG. 3, a third embodiment of a kitchen appliance according to the invention is designated in general by reference number 60.

The structure of the kitchen appliance 60 is generally similar to that of the kitchen appliance 10. Identical parts are provided with the same reference numbers. Only the differences are explained below.

Instead of the insert 24, the kitchen appliance 60 is provided with an insert 62 which, by means of a schematically indicated pivot guide 66, is designed to be pivotable about a pivot axis 64.

The pivot axis 64 extends approximately parallel to the blade 14 and is provided in the end area of the ends of the longitudinal webs 28.

For stabilizing purposes, the ends of the longitudinal webs 28 are connected to one another via an element 68 which can serve at the same time as a grip.

To adjust the cutting height, the schematically indicated clamping means 34 are released. The insert 62 mounted on the main body 12 is then pivoted about the pivot axis 64 until a suitable offset is reached between the blade 14 and the associated section of the insert 62.

The clamping means 34 are then once again actuated in order to fix the insert 62 in the pivot position thus set.

For cutting cuttable material, the kitchen appliance 60 is used exactly like the kitchen appliance 10. The only difference is that the cuttable material for the most part does not abut the blade 14 in parallel, but in general at a small angle thereto, typically in the range of between 1° and 10°.

In FIGS. 4 and 5, a preferred embodiment of a kitchen appliance according to the invention is designated in general by reference number 80.

The kitchen appliance 80 corresponds in terms of its basic design to the kitchen appliance 10 in FIG. 1. Identical parts are consequently identified by the same reference numbers. Only the differences from kitchen appliance 10 are explained.

The kitchen appliance 80 has a main body 81 which has two longitudinal webs 82 and a transverse support 84 connecting the two longitudinal webs 82.

The top of the transverse support 84 forms the run-out surface 22. On an edge directed toward the guide surface 20, a V-shaped blade 86 is integrally formed on the transverse support 84.

The V-shaped blade has two blade halves which in each case extend from one of the transverse supports 84 at an angle of approx. 10° to 70°, in particular approximately 15° to 30°, in relation to the longitudinal axis 18. The blade halves thus enclose an angle in the range of between 30° and 100°, preferably between 30° and 60°.

The longitudinal webs 82 protrude above the run-out surface 22 by a certain height, as can be seen in particular in FIG. 5. By this means, it is possible for a fruit holder (known per se)

to be guided across the top of the longitudinal webs 82 without damaging the V-shaped blade 86.

The longitudinal webs 82 extend forward starting from the transverse support 84 (that is to say counter to the guide direction) and are connected to one another, in the area of their ends, by a further transverse support 87.

An insert 88 whose top serves as guide surface 20 can be inserted into the opening thus formed.

The insert 88 is in general of plate-shaped design and is like-wise approximately V-shaped at its front, that is to say toward the V-shaped blade 86. The tip of the insert 88 can be flattened.

In the inserted state, the insert 88 is mounted displaceably, approximately parallel to the run-out surface 22 (or to the V-shaped blade 86), by means of two parallel guides 90 which are provided on the opposite longitudinal webs 82.

The parallel offset obtained by this means is identified in FIG. 5 by a schematically indicated arrow 91.

The parallel guides 90 each have two guide grooves 100 spaced apart from one another in the longitudinal direction. Each of the guide grooves 100 has an approximately perpendicular groove inlet section 93 and a groove ramp section 92. The groove ramp section 92 adjoins a lower end of the groove inlet section 93 and forms, with the guide surface 20, an angle 94 in the range of 10° to 50°, preferably in the range of between 15° and 30°.

On its side edges, the insert 88 is provided in each case with two guide pins 96 which are spaced apart from one another in the longitudinal direction and whose external diameter is adapted to the width of the guide grooves 100.

To fit the insert 88 into the main body 81, the guide pins 96 are introduced from above into the upwardly open guide grooves 100 and are lowered to the bottom of the groove inlet section 93.

In this state, the insert 88 has the greatest offset in relation to the blade 86.

Starting from this state, the insert 88 can be moved in parallel by means of the guide pins 96 being displaced along the respective groove ramp sections 92.

On account of the groove ramp sections 92, a displacement of the insert in the direction of the longitudinal axis 18, or in the guide direction 36, results necessarily in a movement in the direction perpendicular thereto, namely upward in FIG. 5.

By this means, the offset between insert 88 and blade 86, and consequently the cutting thickness, is reduced.

During use of the kitchen appliance, a considerable force is exerted on the insert 88 from above.

To prevent the insert 88 from bending in the transverse direction, the main body 81 is provided with a further transverse support 102 which is arranged under the V-shaped surface of the V-shaped blade 86 and connects the longitudinal webs 82. The transverse support 102 is provided with a ramp-like surface, at least in a central section, and consequently serves as a central ramp 102.

A corresponding bearing wedge 104 is provided on the underside of the insert 88 and slides on the central ramp 102.

It will be appreciated that the central ramp 102 is provided as an option in order to prevent bending in the transverse direction in the case of relatively thin inserts 88. In order to achieve a stable parallel displaceability, it would alternatively also suffice to provide the central ramp 102 and only two opposite guide grooves 100 (instead of four as in the embodiment shown). In this alternative case (not shown), a 3-point bearing would thus be obtained which is known to be sufficient for stable support.

In FIG. 4, reference number 106 indicates a row of perpendicular blades provided on the insert 88 and offset in the transverse direction. It will be appreciated that such a row of blades 106 is optional and can be present on some inserts 88 and not on others.

In FIG. 4, reference number 108 indicates fixing means.

Although the insert 88 can be fixed releasably in a defined position relative to the blade 86 by clamping means, as are indicated schematically in FIG. 1 for example, in the present case locking means 108 are provided.

The fixing means 108 comprise, on a rear lateral section of the insert 88, a large number of grooves 110 spaced apart from one another in the longitudinal direction, and an elastically deflecting latch 112 provided on one of the longitudinal webs 82.

In the unstressed state, the catch 112 engages in one of the grooves 110 and consequently fixes the longitudinal position of the insert 88 in relation to the main body 81 and consequently the cutting thickness which is shown schematically at 98 in FIG. 5.

To adjust the cutting height, the catch 112 is deflected laterally outward, as is shown schematically at 114 in FIG. 4. The catch consequently frees the insert 88 so that the latter can move freely in the longitudinal direction. As soon as the suitable cutting thickness is set, the catch 112 is once again released so that it snaps into one of the grooves 110 and the insert 88 is fixed on the main body 81.

Locked fixing is possible only when the guide pins 96 are located in the groove ramp sections 92.

On account of the fact that the groove ramp sections 92 delimit the guide pins 96 at the top and bottom, even these simple fixing means 108 always provide a defined position of the insert 88 in relation to the main body 81.

It will be appreciated that the angle 94 of the groove ramp sections 92 and that of the central ramp 102 are preferably the same.

It is also preferable if, as is shown, the insert 88 is moved parallel to the blade 86 and to the run-out surface 22. However, is also in general conceivable for the insert 88 to be arranged slightly inclined in relation to the blade 86 and to the run-out surface 22 and to be moved in parallel starting from such an inclined position.

The view of the kitchen appliance 80 in FIGS. 4 and 5 is a generally schematic one. It will be appreciated that appropriately shaped grips can be provided for ergonomic handling. It will also be appreciated that edges shown as angular in the figures can in practice be rounded, in order to allow the kitchen appliance 80 to be produced largely by plastic injection-molding.

Thus, the main body 81 and/or the insert 88 are preferably made of plastic, and the V-shaped blade 86 of suitable and preferably stainless steel.

If clamping means are provided instead of the locking means 108, it is possible to obtain a stepless adjustment of the cutting thickness 98.

Moreover, it will be appreciated that, instead of the ramps 92 and 102, it is also possible to provide other parallel guides, for example parallelogram linkage guides.

In an alternative embodiment which is not shown, it is also possible for the guide grooves 100 to be U-shaped, for example, in plan view, so that a parallel displacement is generally effected which is not inclined but instead perpendicular to the longitudinal axis 18. In such a case, other fixing means are of course to be provided, preferably clamping means.

Figure 6:
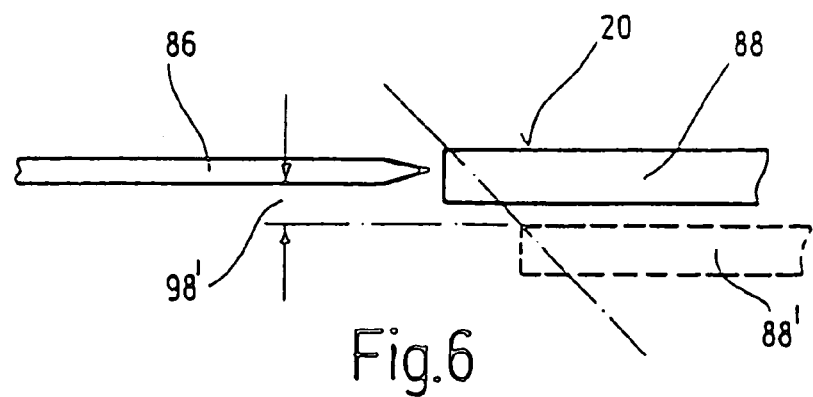
FIG. 6 shows a schematic detail to explain a child safety feature.

In a preferred configuration, as is shown in FIG. 6, the insert 88 can be displaced upward until its top, that is to say the guide surface 20, lies above the cutting edge of the blade 86. Such a setting, which is shown by solid lines in FIG. 6, is one in which the kitchen appliance 80 can be put aside or stored. The sharp cutting edge of the blade 86 is protected here. This embodiment thus serves as a child safety feature.

An operating position for cutting cuttable material with a defined cutting thickness 98' is shown by broken lines in FIG. 6.

Figure 7:
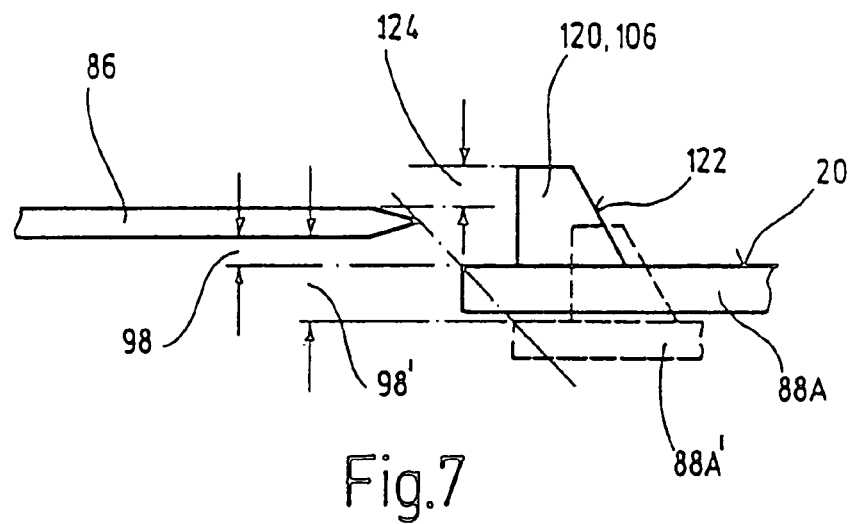
FIG. 7 shows a schematic view to explain the use of the kitchen appliance for cutting cubes.

Instead of the insert 88 which is shown in FIGS. 4 and 5 and which has a smooth or plane guide surface 20 (which can also be structured), an alternative exchangeable insert 88A according to FIG. 7 has a large number of perpendicular individual blades 120 spaced apart from one another in the transverse direction. The blades 120 are arranged, for example, in the way shown at 106 in FIG. 4.

The blades 120 project from the guide surface 20 by a value which permits two alternative operating modes.

In the position of the insert 88A shown by solid lines in FIG. 7, the top of the blades 120 projects relative to the blade 86 by a value which is shown generally at 124 in FIG. 7.

The value 124 is greater than the cutting thickness 98 obtained in this position.

When using the kitchen appliance 80 with the insert 88A in this position, a row of strips is generated in a first cutting maneuver by means of the cutting edges 122 of the blades 120 and then cut off with the cutting thickness 98. Because of the projection 124, that part of the cuttable material not cut off is likewise cut into in the longitudinal direction. If the cuttable material is turned through 90° before the next cutting maneuver, the strips of the cuttable material which have as it were been cut in are then cut through by the cutting blades 120 and finally cut off as cubes by means of the blade 86. The cuttable material is again turned through 90° prior to the next cutting maneuver, and so on.

Consequently, cubes or blocks can be produced in the position shown (cubes only if the distance between the blades 120 corresponds to the cutting thickness 98).

In a second position of the insert 88A, shown by broken lines in FIG. 7, the top of the blades 120 is approximately level with the cutting edge of the blade 86. Consequently, on each cutting maneuver, strips of the cuttable material are cut off. The underside of the cuttable material is not cut into.

It will be appreciated that further inserts 88A, etc., can be combined with the main body 81, which inserts for example have individual blades 120 of smaller height and/or different spacing in order to be able to produce strips and/or cubes of different dimensions.

However, the concept of being able to bring the exchangeable insert 88A into a position in which perpendicular blades arranged on the insert 88A project relative to the "main blade" 86 in order consequently to be able to cut cubes or blocks is regarded as inventive in itself, irrespective of the mobility of the insert as a whole in the inserted state.

Figure 8:
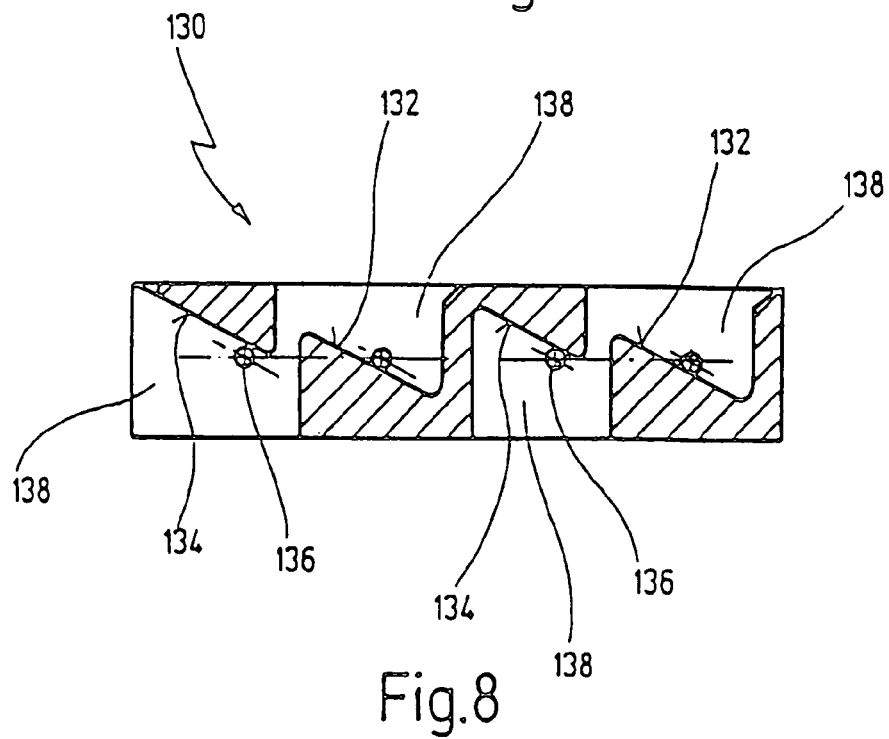
FIG. 8 shows an alternative embodiment of a ramp guide.

A further alternative embodiment is shown schematically in FIG. 8.

In the alternative embodiment, instead of the parallel guides 90, a parallel guide 130 is in each case provided which, instead of guide grooves 100 of approximately constant width, has the following shape.

The surface of the parallel guides 130 is structured in such a way as to provide two bearing ramps 132 spaced apart from each other in the axial direction, and two axially offset holding ramps 134 interlacing with the bearing ramps 132.

Instead of two axially offset guide pins 96, four axially offset guide pins 136 are provided on the insert 88 (not shown) in this embodiment.

Two of the guide pins lie on the bearing ramps 132, and two other guide pins 136 lie on the underside of the holding ramps 134.

In this embodiment too, it is guaranteed that such an insert with guide pins 136 is forced upward or downward during an axial movement, that is to say a defined position between main body and insert is obtained at all times.

In contrast to the parallel guide 90 with the relatively narrow guide grooves 100, the parallel guide 130 is designed with recesses 138 of large surface area which are considerably easier to clean. Moreover, dirt cannot gather so easily in the recesses 138 of large surface area.

In FIGS. 9 to 14, a fifth embodiment of a kitchen appliance is indicated generally by reference number 150.

In terms of its general function, the kitchen appliance 150 corresponds to the kitchen appliances already discussed.

Figure 9:
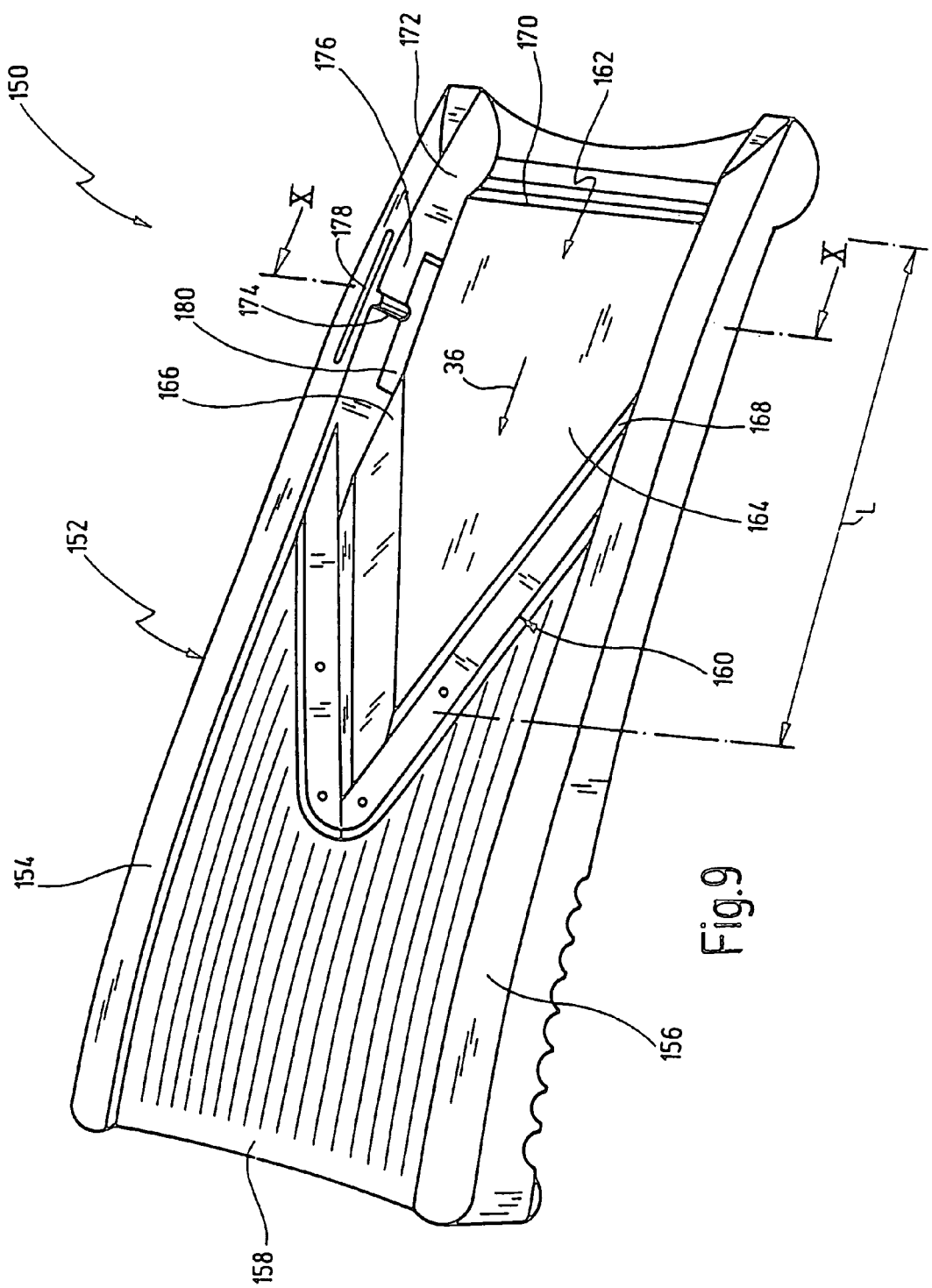
FIG. 9 shows a perspective view of a main body in a fifth embodiment of a kitchen appliance according to the first and second aspects of the invention.

The kitchen appliance 150 has a main body 152 which is shown in FIGS. 9 to 11.

The main body 152 comprises two longitudinal webs 154, 156 which extend approximately in parallel and between which a run-out surface 158 is formed.

The run-out surface 158 is provided at its front edge with a V-shaped blade 160. To this extent, this structure corresponds to the structure of the known V-shaped slicer from the present Applicant.

The main body 152 also has a receiving seat 162 for an exchangeable insert.

The receiving seat 162 has a supporting plate 164 extending between the two longitudinal webs 154, 156.

The supporting plate 164 is substantially parallel to the run-out surface 158. The supporting plate 164 has two ramps 166, 168 which are oriented to each other in a V arrangement in accordance with the V-shaped blade 160. The ramps 166, 168 each rise from the supporting plate 164 at an angle 169 (FIG. 13) of approximately 8°.

At its front end, the supporting plate 164 has a transverse edge 170 which is adjoined by a downwardly extending grip section.

The receiving seat 162 is laterally delimited by the longitudinal webs 154, 156. A side wall 172 of the longitudinal web 154 faces toward the receiving seat 162.

Provided in the area of the side wall 172 there is a locking device 173 for fixing an insert. The locking device 173 has a locking lug 174 extending perpendicular to the guide direction 36. The locking lug 174 is formed on an elastic web 176 of the side wall 172. By this means it is possible for the locking lug 174 to yield laterally when the insert is pushed in.

As an alternative to a lateral locking device 173, it is also conceivable to integrate the locking device in the supporting plate 164.

The elastic web 176 is formed by an oblong hole 178 in an upper area of the longitudinal web 154 and by an oblong hole 180 extending parallel thereto in the side wall 172. The elastic web 176 is formed between these two oblong holes 178, 180.

As is shown schematically in FIG. 10, at least one transverse web 184 is provided under the supporting plate 164 and between the longitudinal webs 154, 156. The supporting plate 164 tapers in a V-shape in accordance with the V-shaped blade 160. The jib-like section formed in this way and pointing toward the V-shaped blade 160 is supported from underneath by the at least one transverse web 184.

This ensures that the section of the supporting plate 164 tapering in a V-shape is not deflected downward when pressure is exerted from above by the cuttable material.

As can be seen from FIGS. 9 and 11, a run-out lip 186 adjoins the ramps 166, 168. The run-out lip 186 is oriented substantially parallel to the supporting plate 164 and to the V-shaped blade 160. In the lowest position of the insert (which will be discussed below), the run-out lip 186 serves as part of the guide surface for the cuttable material.

In FIGS. 12 to 14, an insert to be inserted into the receiving seat 162 of the main body 152 is indicated in general at 190.

The insert 190 is shown in a view from underneath in FIG. 12.

The insert 190 has a base plate 192 which has a substantially rectangular section and a section tapering in a V shape.

The top of the insert 190 is designed substantially plane as a guide surface 194. The insert 190 is in this case generally arranged in the receiving seat 162 in such a way that the guide surface 194 extends parallel to the plane of the V-shaped blade, and does so for all cutting thicknesses 98.

The underside 195 of the base plate 192 is adapted to the shape of the receiving seat 162.

In the rear section tapering in a V shape, the base plate 192 has two wedge surfaces 196, 198 on its underside 195. The wedge surfaces 196, 198 are adapted in terms of arrangement, size and angle to the ramps 166, 168 of the receiving seat 162.

At the front end (the left end in FIG. 12), the base plate 192 has a wedge section 200 becoming thicker toward the front. The slope of the wedge section corresponds to the angle 169.

As can be seen in FIG. 13, the underside 195 of the base plate 192 is parallel to the guide surface 194 along a length L. The length L is correspondingly shown in FIG. 9.

It will be seen that the receiving seat 162 and the underside 195 of the base plate 192 are adapted to one another in such a way that in a first position (with the greatest cutting thickness) the insert 190 lies flat on the supporting plate 164. The guide surface 194 in this case lies approximately level with the run-out lip 186. The wedge section 200 protrudes forward relative to the transverse edge 170 of the supporting plate 164.

Two opposite longitudinal edges 202 of the insert 190 lie parallel to the side walls 172 of the receiving seat 162.

A large number of locking recesses 204 arranged in succession in the longitudinal direction are provided on one longitudinal edge 202.

The locking recesses 204 are adapted to the locking lug 174 of the locking device 173.

FIG. 10 also shows two retaining lugs 182 which project inward from the side walls 172. The retaining lugs 182 serve to longitudinally guide the insert which is to be introduced into the receiving seat 162. They ensure that the insert 190 cannot be pushed upward out of the receiving seat 162.

The insert 190 is pushed into the receiving seat 162 from the front toward the rear (from right to left in FIG. 9). In so doing, the side edge 202 pushes the locking lug 174 elastically aside until the locking lug 174 snaps into the first of the locking recesses 204. In this state, as has been mentioned above, the guide surface 194 lies approximately level with the run-out lip 186. The greatest cutting thickness is set. By pushing the insert 190 further toward the rear, a parallel displacement of the insert 190 in relation to the supporting plate 164 is obtained (and consequently parallel to the plane of the blade).

This is because, as the insert 190 is pushed further toward the rear inside the receiving seat 162, the wedge surfaces 196, 198 on the one hand slide upward on the ramps 166, 168. On the other hand, the front part of the insert 190 is lifted to the same extent by the wedge section 200 being guided over the transverse edge 170.

As is shown in FIG. 12, the insert 190 has, for example, five locking recesses 204. Four of these recesses are used for different height adjustments of the guide surface 194 and consequently for different cutting thicknesses.

As soon as the locking lug 174 has snapped into the last of the locking recesses 204, the guide surface 194 lies approximately level with the V-shaped blade 160 or slightly above it, so that it is largely impossible to accidentally cut oneself on the V-shaped blade. This last position consequently corresponds to a storage or safety position, in accordance with FIG. 6.

It will be seen that in this embodiment the ramps or wedge surfaces are designed as flat ramps which directly adjoin other surfaces of the bodies in question (main body 152 or insert 190). Overall, a kitchen appliance 150 is thus obtained in which the height can be adjusted in a large number of steps (more than two) in a simple manner. Handling is also very straightforward even for the unpracticed user.

Moreover, the overall smooth design of the surfaces of both the main body 152 and the insert 190 ensures that the kitchen appliance as a whole is easy to clean. Remains of cut material cannot collect in small grooves or other recesses.

In the kitchen appliance 150, the receiving seat 162 is formed in one piece with the main body 152. Thus, in the simplest case, the kitchen appliance 150 consists of only two parts. However, it will be appreciated that, instead of the insert 190, it is also possible, for example to use inserts with transverse blades, as are indicated schematically in FIG. 7.

In FIGS. 15 to 18, a sixth embodiment of a kitchen appliance according to the invention is indicated in general by reference number 150'.

In almost every aspect, the kitchen appliance 150' corresponds to the kitchen appliance 150 in FIGS. 9 to 14.

In the kitchen appliance 150', the same inserts 190 are used as in the kitchen appliance 150. The kitchen appliance 150' differs from the kitchen appliance 150 in that the main body 152' is not designed directly to receive the insert 190, but instead the main body 152' is designed to receive an adapter, which is indicated by reference number 210 in FIGS. 15 to 17.

The main body 152' can be a conventional main body of a V-shaped slicer from the prior art. In this type of main body, it is possible to insert an insert in each case from front to rear into a defined operating position. To adjust the cutting thickness, different inserts can be pushed in, or an insert can be pushed in after it has been turned round.

In the kitchen appliance 150', the adapter 210 is inserted into the defined operating position instead of such a known insert. The combination of main body 152' and adapter 210 can then be handled exactly like the main body 152 which was described above.

In order to differentiate them, the corresponding elements of the adapter 210 and of the main body 152' are each provided with an apostrophe mark.

In FIG. 18, a receiving seat for the adapter is also indicated by reference number 212. The receiving seat 212 has guide rails 214 on each side in the area of the side surfaces 218. Also provided on the side surfaces 218 of the receiving seat 212 are locking recesses 216 which allow the adapter 210 to be fixed in the one operating position.

In one side surface 218 there is also an elastic web 220 formed by two parallel oblong holes, similar to the oblong holes 178, 180 in FIG. 9. However, there is no inwardly projecting lug provided on the elastic web 220.

As is shown in FIG. 15, the adapter 210 has a supporting plate 164' which is substantially rectangular with an end tapering in a V-shape. On the end tapering in a V-shape, there are two ramps 166', 168' which merge into a run-out lip 186'.

Two side walls 172' are each provided in the rectangular area. On one side wall 172' there is an elastic web 176' on whose inside a locking lug 174' protrudes inward. The elastic web 176' is formed by an oblong hole in the transition area between the supporting plate 164' and one side wall 172'.

Retaining lugs 182' are formed on the top of each of the two side walls 172'.

The arrangement of the locking device 173' is adapted to the arrangement of the elastic web 220. Consequently, it is possible also to move the insert 150 in the longitudinal direction, for height adjustment, when the adapter 210 is fitted in the operating position. The locking lug 174' on the elastic web 176' is deflected to the side, which is made possible by the elastic design of the web 220.

If the main body 152' is designed without the oblong holes, that is to say without elastic web 220, as is the case with conventional V-shaped slicers, a relative axial displacement between adapter 210 and insert 190 is only possible when the adapter 210 is removed from the operating position.

A lateral deflection of the lug 174' is not possible in the operating position.

In this way, the arrangement of adapter 210 and insert 190 can be held in an inherently stable manner in the receiving seat 212. Adjustment of the cutting thickness is nevertheless comparatively easy. To do this, the whole arrangement of adapter 210 and insert 190 is simply removed briefly from the receiving seat 212. The insert 190 and the adapter 210 are then displaced axially in relation to one another. The whole arrangement is then inserted back into the operating position in the receiving seat 212.

In the kitchen appliance 150' too, adjustment of the cutting thickness is realized by solid parts with smooth surfaces, so that the kitchen appliance 150' as a whole is easy to clean and robust in handling.

It will be appreciated that an arrangement of adapter 210 and insert 190 is an independently marketable product which can be purchased as an "add-on" for existing V-shaped slicers of conventional type.

It will be appreciated that the preferred configurations according to FIGS. 6 to 8 can alternatively be applied to the kitchen appliances 10, 40, 150, 150'. The embodiments in FIGS. 6 and 7 can also be applied to the kitchen appliance 60.

The invention claimed is:

1. An appliance for cutting food, comprising:
a main body;
a cutting thickness control insert member;
said main body including a receiving seat for said cutting thickness control insert member;
a cutting blade having a cutting edge and being attached to said main body;
said main body comprising a run-out surface level with said cutting edge;
said insert member comprising a guide surface, having an edge, and upon which surface food is moved to and fro; and
said insert member is mounted to be movable transverse to the guide surface, so that the guide surface is offset in relation to the blade, and food moves along said guide surface in a guide direction toward said blade and onto said run-out surface, the offset between said blade and said guide surface controlling cutting thickness;
wherein the insert member is movable into a safety position in which an edge of the insert member is adjacent to the cutting edge, and in which said edge of the guide surface, lying opposite said blade when not cutting food, lies above the cutting edge of said blade,
wherein a locking device is provided for fixing the insert member in one of several positions on the main body, wherein the locking device comprises a locking lug on the main body and locking recesses in the insert member so that the locking lug can be received in any one of the locking recesses to adjust the cutting thickness in steps, and
wherein the safety position is one of the several positions, wherein the other positions of the several positions are used for establishing different cutting thicknesses.

2. The appliance of claim 1, wherein the insert member is removable from the main body.

3. The appliance of claim 1, wherein the insert member is mounted so as to be moveable perpendicular to the guide direction.

* * * * *